United States Patent [19]

Rialan et al.

[11] Patent Number: 4,979,152

[45] Date of Patent: Dec. 18, 1990

[54] DEVICE FOR TRANSMITTING SIGNALS BY RADIO AND CABLE BETWEEN A CENTRAL CONTROL AND RECORDING SYSTEM AND DATA ACQUISITION DEVICES

[75] Inventors: Joseph Rialan, Meudon; Gérard Thierry, Paris, both of France

[73] Assignee: Institut Francais du Petrole, Rueil-Malmaison, France

[21] Appl. No.: 564,392

[22] Filed: Dec. 22, 1983

Related U.S. Application Data

[63] Continuation-in-part of Ser. No. 411,133, Aug. 24, 1982, Pat. No. 4,583,206.

[30] Foreign Application Priority Data

Dec. 22, 1982 [FR] France ............................... 82 21730

[51] Int. Cl.[5] .............................................. G01V 1/22
[52] U.S. Cl. ........................................ 367/77; 367/76; 455/53; 340/539
[58] Field of Search ...................... 367/77, 78, 79, 80, 367/76; 455/7, 14, 73, 88, 53; 340/870.01, 870.07, 870.11, 539; 128/903, 904

[56] References Cited

U.S. PATENT DOCUMENTS

| | | | |
|---|---|---|---|
| 4,296,485 | 10/1981 | Clemens | 367/77 |
| 4,408,307 | 10/1983 | Harris | 367/79 |
| 4,583,206 | 4/1986 | Rialan et al. | 367/78 |

OTHER PUBLICATIONS

"Over the TV Horizon", 1959, (455/7).
*Gus–Bus Digital Seismic Telemetry System*, Gus Manufacturing, Inc., 9/1977, p. 5.

*Primary Examiner*—Thomas H. Tarcza
*Assistant Examiner*—D. T. Pihulic
*Attorney, Agent, or Firm*—Antonelli, Terry, Stout & Kraus

[57] ABSTRACT

In a data acquisition for seismic exploration, where the terrain is rugged or includes natural features which prohibit satisfactory radio communication between a central control and recording system and a plurality of seismic data signal acquisition devices, a relay element and a transmission cable are provided so that those acquisition devices which are not capable of satisfactory radio communication with the central control and recording system communicate instead with the relay element either by transmission cable or radio transmission and the relay element in turn communicates with the central control and recording system either by radio transmission or transmission cable, respectively.

14 Claims, 2 Drawing Sheets

DEVICE FOR TRANSMITTING SIGNALS BY RADIO AND CABLE BETWEEN A CENTRAL CONTROL AND RECORDING SYSTEM AND DATA ACQUISITION DEVICES

This application is a continuation-in-part of our prior co-pending U.S. application Ser. No. 411,133, filed Aug. 24, 1982, now U.S. Pat. No. 4,583,206, issued Apr. 15, 1986.

FIELD OF THE INVENTION

The present invention relates in general to a data acquisition system for seismic exploration, and is directed more particularly to a device for transmitting signals between a central control and recording system and a plurality of seismic data acquisition devices using both cable and radio-channel links.

BACKGROUND OF THE INVENTION

In data acquisition systems for seismic exploration, it is known to transmit signals between a central control system and a plurality of seismic data acquisition devices, which devices are set up to transmit back to the central control system by radio or cable the seismic signals which they have collected, numbered and recorded. These data signals are provided to the acquisition devices by sets of seismic sensors which are distributed along a seismic profile to be studied in response to the echoes of seismic signals generated in the ground by an appropriate shock source on underground reflective layers.

A device which is designed to transmit commands and data by cable or radio waves is described in published French Pat. No. 2,511,772 which corresponds to our above-referenced U.S. Pat. No. 4,583,206. Such device is associated, on the one hand, with the central command and recording system and with a number of acquisition devices, each of which is designed to communicate with the central control and recording system by radio or cable and includes a number of stationary means of connection which make it possible, when they are set up, to connect each device to a common transmission cable and to disconnect the associated means of radio transmission and reception in the device. This makes it possible for the central control and recording system to communicate with each acquisition device either by cable or by radio depending on the type of link actually being used. These acquisition devices associated with their means of transmission and reception by radio and their particular stationary means of connection are housed in boxes (or buoys in the case of underwater exploration) deployed in the field a certain distance apart and connected to the seismic receivers.

After the acquisition devices have collected the data provided by the seismic sensors with which they are associated, the central control and recording system sends transmission commands in succession to all of the acquisition devices in order to have them transmit the signals collected on the common transmission cable or by radio. The data transmissions are preferably made by radio when the transmission quality is adequate. However, when the terrain where the boxes are deployed is rugged or when obstacles (thick forests, for example) make good transmission of the radio waves from certain boxes or certain particular groups of boxes difficult, these boxes should be connected to the central control and recording system by a transmission cable while the others are connected to the central system by radio.

The cable links are very reliable regardless of the nature or relief of the terrain, but the installation of the cables requires time-consuming and expensive laying and removal operations, especially in mountainous or swampy areas.

The selective connection of the boxes or buoys to the common transmission cable makes it possible to significantly simplify the phase of installing the seismic data acquisition system in the field. However, this mixed transmission system sometimes exhibits certain drawbacks when, for example, the number of boxes for which satisfactory radio links are impossible is relatively small and when it is still necessary to deploy a transmission cable, sometimes over long distances, in order to connect certain boxes to the central system while traversing areas where radio links are satisfactory. This case arises, for example, when some of the boxes are deployed on the same side of a terrain elevation as the central control and recording system and is accessible by radio, while other boxes are installed on the opposite side and are accessible only by transmission cable. Such a cable must consequently be laid in order to cross the terrain elevation and make it possible to connect these remote boxes to the central system.

In certain cases as well, the majority of the boxes or buoys are deployed in an area within which radio transmission is satisfactory, but access to them from the central command and recording system is still difficult when the central system is located outside of the above-mentioned zone. This also makes it necessary to lay a long transmission cable between these boxes and the central system.

SUMMARY OF THE INVENTION

The principal object of the present invention is to provide a device for transmitting signals by radio and-/or cable between a central control and recording system and a plurality of data acquisition devices, which avoids the above-mentioned drawbacks of prior devices and systems.

A noteworthy feature of this invention is the fact that it relates to a device which includes a relay element equipped with a radio transmitter-receiver set which is associated with means for the transmission and reception of signals on a transmission cable. This relay element is connected to at least some of the acquisition devices or to the central control and recording system by means of a transmission cable.

In a first embodiment, the relay element is connected to some of the acquisition devices by a transmission cable and is hooked up to the central control and recording system by radio. In this case, the device makes it possible to avoid laying a transmission cable between the central system and the relay element.

In the second embodiment, the relay element is connected to the central control and recording system by a transmission cable and to at least some of the acquisition devices by radio. In this case the device makes it possible to avoid laying a transmission cable between the relay element and some of the acquisition devices which are accessible by radio from the above-mentioned relay element.

BRIEF DESCRIPTION OF THE DRAWINGS

Other characteristics and advantages of the present invention will become apparent from a reading of the detailed description of various exemplary embodiments with reference to the attached drawings, in which.

DETAILED DESCRIPTION OF THE PREFERRED EMBODIMENTS

Figure 1:
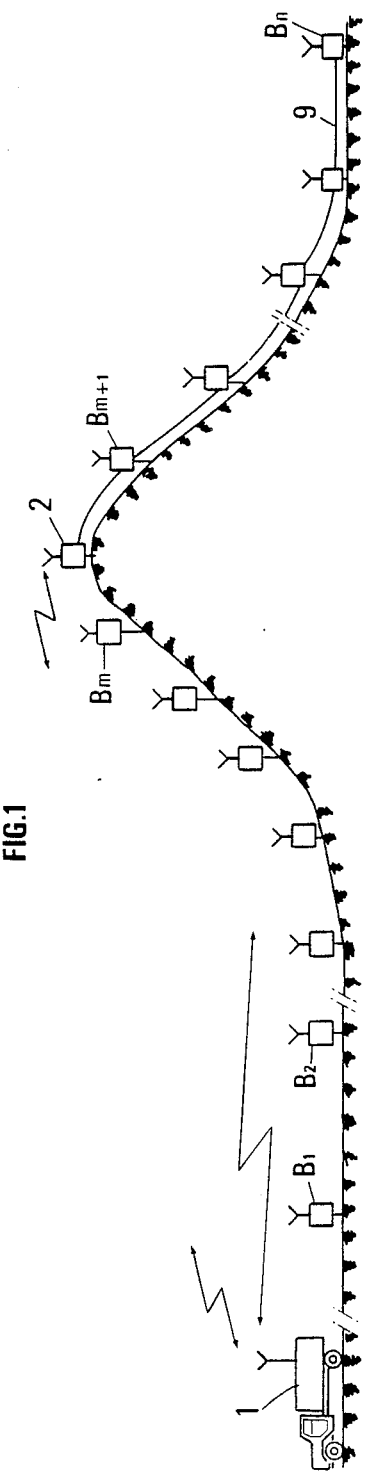
FIG. 1 is a schematic diagram of the device forming a first embodiment of the invention.

In the first embodiment shown in FIG. 1, the central control and recording system 1, which is installed on a truck, for example, can communicate by radio waves with a first group $B_1, B_2, \ldots, B_m$ of a series of n seismic data acquisition devices which are distributed in the field. However, the other devices $B_{m+1}, B_{m+2}, \ldots, B_n$ of the series, which constitute a second group, are more difficult to reach by radio, for some reason which may be connected with, for example, the topography of the terrain in, or because of its vegetation.

Figure 3:
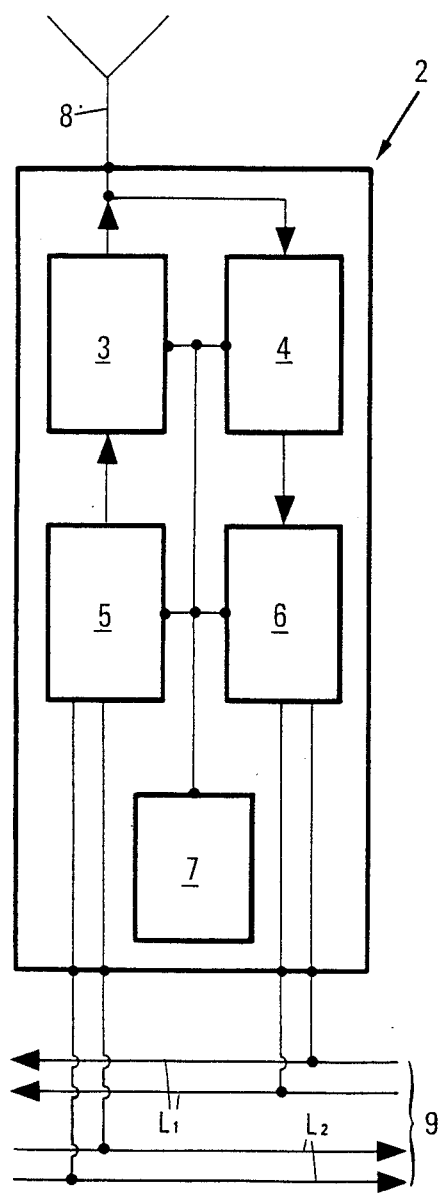
FIG. 3 shows the relay element of the device of FIG. 1.

To solve the problem of communication with the second group of acquisition devices, a relay element 2 is provided as close as possible to the acquisition devices of the second group but in a location where the radio links to the central system are satisfactory. The relay element includes, as seen in FIG. 3, a radio wave transmitter 3 and a radio receiver 4, an adapter-amplifier filter 6 having its input connected to the output of receiver 4 and a power supply system 7. The output of transmitter 3 and the input of receiver 4 are connected to a transmitting-receiving antenna 8.

A transmission cable 9 (FIG. 1) which comprises two lines $L_1$, $L_2$ (FIG. 3) is laid in order to make it possible to interconnect the various devices $B_{m+1}$ to $B_n$ of the second group of acquisition devices to relay element 2. Line $L_1$ is used to transmit command signals to the acquisition devices, while line $L_2$ is used by these acquisition devices to transmit the appropriate signals in response to the particular command signals which they receive on line $L_1$. The input of amplifier filter 5 is connected to line $L_2$, which is composed of a pair of stranded conductive wires. The output of amplifier 6 is connected to line $L_1$, also composed of a stranded wire pair.

The device of FIG. 1 operates as follows.

The central control and recording system 1 transmits by radio coded commands associated with address signals identifying a particular acquisition device. Each acquisition device is designed to consider only the command signals which correspond to the address number which is assigned to that acquisition device. Through its antenna 8, relay element 2 receives the radio signals originating from the central system; and, it detects and amplifies these signals before transmitting them on line $L_1$ to acquisition devices $B_{m+1}$ to $B_n$ which are connected to that line. If the order transmitted applies to any of devices $B_{m+1}$ to $B_n$ of the second group, as indicated by the accompanying address, this device reacts by hooking up to line $L_2$ of the transmission cable and transmitting on it the appropriate data signals to relay element 2, which shapes these signals by means of amplifier 5 and transmitter 3 in order to transmit them in the form of radio waves to central control and recording system 1 and devices $B_1$ to $B_m$ of the first group are effected exclusively by radio.

Figure 2:
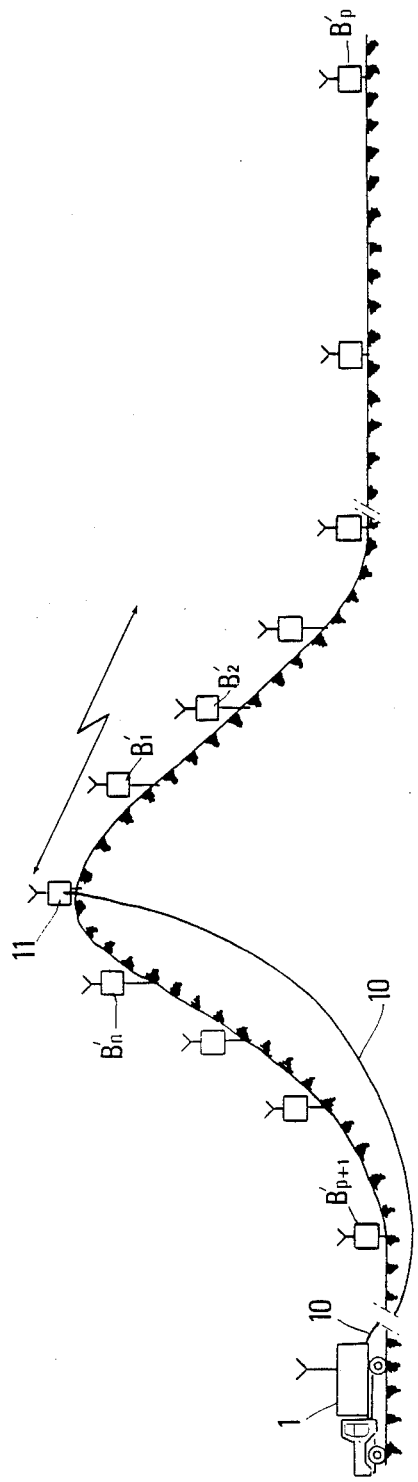
FIG. 2 is a schematic diagram of the device forming a second embodiment of the invention.
Figure 4:
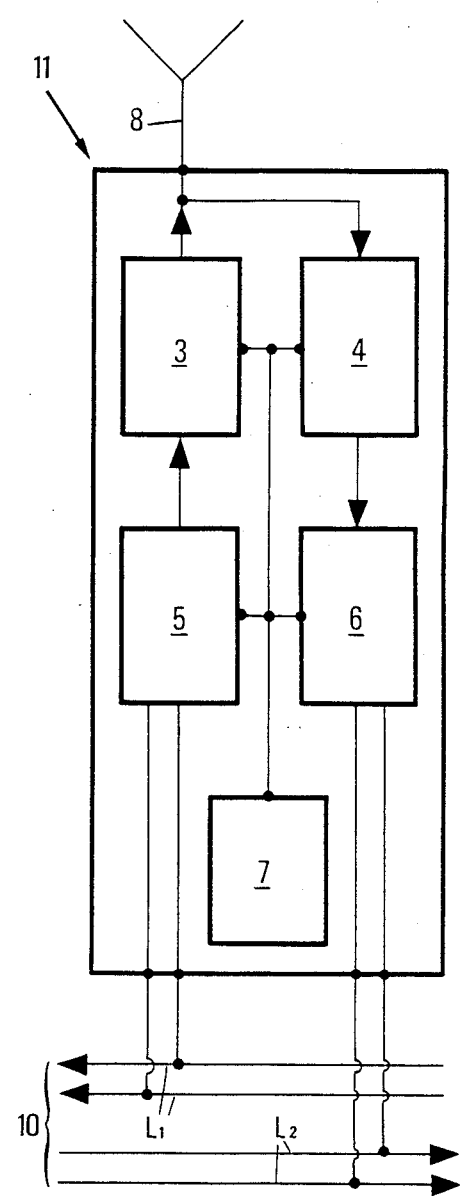
FIG. 4 shows the relay element of the device of FIG. 2.

In the second embodiment of the invention shown in FIG. 2, central control and recording system 1 can communicate via a transmission cable 10 having two lines $L_1$, $L_2$ with a relay element 11 (FIG. 4) which is identical to that in FIG. 3 and is installed in a location such that it can communicate by radio with a group of p devices $B'_1, B'_2, \ldots, B'_p$ of a set of n seismic data acquisition devices. On the other hand, the central control and recording system communicates with the (n−p) devices $B'_{p+1}, \ldots, B'_n$ of the series directed by radio. The relay element in FIG. 4 is distinguished from that shown in FIG. 3 solely by its connections to lines $L_1$ and $L_2$ of transmission cable 10. In this case, the input of amplifier 5 and the output of amplifier 6 are connected, respectively, to lines $L_1$ and $L_2$.

In the same way as previously described, the central control and recording system 1 transmits by radio and on transmission cable 10 command signals which are associated with address signals which identify particular acquisition devices. These command signals are received by radio by acquisition devices $B'_{p+1}$ to $B'_n$ and, by means of transmission line $L_1$ of the transmission cable, by relay element 11 which amplifies and shapes them before transmitting them in the form of radio signals to the various devices $B'_1, B'_2, \ldots, B'_p$. If one of the commands transmitted applies to one of the p devices of this group, this device will react by transmitting by radio the appropriate data signals in response to the command received. These data signals are received by relay element 11, which amplifies them before transmitting them to central control and recording system 1 by means of line $L_2$ of transmission cable 10.

It would not exceed the scope of the present invention to use, in the second embodiment described above, transmission cable 10 laid between relay element 11 and central system 1 to directly connect to it the (n−p) devices $B'_{p+1}$ to $B'_n$ of the series of some of them if their relative arrangement would facilitate such connections. In this case, these devices would automatically switch to the cable for the purpose of exchanging signals with central control and recording system 1.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A device for bi-directional transmission of signals between a central control and recording system and a plurality of acquisition devices over areas including locations from which reliable direct radio transmission to the central control and recording system is impossible, each of said acquisition devices including means for collecting signals originating from a seismic sensor or a set of seismic sensors and means for digitizing and storing said sensor signals so that said stored signals may be transmitted to said central control and recording system upon receipt of control signals from the central control and recording system, said central control and recording system including means for receiving and recording the seismic signals collected by said acquisition devices, each of said acquisition devices and said central control and recording system being equipped with transmission means for two-way transmission of data by radio or by transmission cable; said bi-directional transmission device comprising:

a transmission cable; and a relay element which is equipped with a radio transmitter-receiver set and means connected to said radio transmitter-receiver set and said transmission cable for transmitting signals received via said transmitter-receiver set on said transmission cable and for supplying to said transmitter-receiver set signals received on said transmission cable for transmission by radio link, said relay element being connected via said transmission cable either to those particular acquisition devices of said plurality of acquisition devices which are at locations from which direct radio transmission to said central control and recording system is impossible or to the central control and recording system and being disposed at a location near a boundary of an area where reliable direct radio transmission between said central control and recording system and said particular acquisition devices cannot be established, whereby bi-directional exchanges of signals between said central control and recording system and said particular acquisition devices are conducted by using both said transmission cable and a radio link via said radio transmitter-receiver set in said relay element.

2. Transmission device according to claim 1, wherein said relay element is connected to a group of said particular acquisition devices by said transmission cable and communicates with said central control and recording system by radio transmission.

3. Transmission device according to claim 1, wherein said relay element is connected to said central control and recording system by said transmission cable and communicates with at least a first group of said particular acquisition devices by radio transmission.

4. Transmission device according to claim 3, wherein said transmission cable is connected to acquisition devices of a second group of said particular acquisition devices.

5. Transmission device according to claim 1, in which said transmission cable comprises two transmission lines which are connected, respectively, for the transmission of command signals generated by said central control and recording system and of data signals from the acquisition devices to which the command signals apply, said radio transmitter-receiver set including a radio wave transmitter and a radio wave receiver the respective output and respective input of which are connected to a transmitting-receiving antenna, and two filter amplifiers which are connected, respectively, to the input of said transmitter and the output of receiver, said two filter amplifiers being connected, respectively, to the two lines of said transmission cable.

6. Transmission device according to claim 5, wherein the filter amplifier connected to the input of said transmitter is connected to the transmission line which carries said data signals from said particular acquisition devices, and the filter amplifier connected to the output of said receiver is connected to the transmission line which carries said command signals to said particular acquisition devices.

7. Transmission device according to claim 5, wherein the filter amplifier connected to the input of said transmitter is connected to the transmission line which carries said command signals from said central control and recording system, and the filter amplifier connected to the output of said receiver is connected to the transmission line which carries said data signals to said central control and recording system.

8. A device for bi-directional transmission of signals between a central control and recording system and a plurality of acquisition devices over areas including locations from which reliable direct radio transmission to the central control and recording system is impossible, each of said acquisition devices being connected to collect signals originating from a seismic sensor or a set of seismic sensors to digitize and memorize said sensor signals and to transmit the memorized signals to said central control and recording system upon receipt of control signals from the central control and recording system, said central control and recording system including means for receiving and recording all of the seismic signals collected by said acquisition devices, each of said acquisition devices and said central control and recording system being equipped with transmission means for two-way transmission of data by radio or by transmission cable and each of said acquisition devices being provided with communication means for automatically switching off the radio transmission means when connection to a transmission cable is realized; said bi-directional transmission device comprising:

a transmission cable; and a relay element which is equipped with a radio transmitter-receiver set for transmitting signals received via said transmitter-receiver set on said transmission cable and for supplying to said transmitter-receiver set signals received on said transmission cable for transmission by radio link, said relay element being connected via said transmission cable to those particular acquisition devices of said plurality of acquisition devices which are at locations from which direct radio transmission to said central control and recording system is impossible or to the central control and recording system and being disposed at a location near a boundary of an area where reliable direct radio transmission between said central control and recording system and said particular acquisition devices cannot be established.

9. Bi-directional transmission device according to claim 8, wherein each of said plurality of acquisition devices includes means for selectively transmitting the memorized signals to said signal central control and recording system upon receipt of control signals either directly from the central control and recording system or upon receipt of control signals via said relay element and transmission cable.

10. Transmission device according to claim 8, wherein said relay element is connected to said particular acquisition devices by said transmission cable and communicates with said central control and recording system by radio transmission.

11. Transmission device according to claim 8, wherein said relay element is connected to said central control and recording system by said transmission cable and communicates with said particular acquisition devices by radio transmission.

12. Bi-directional transmission device according to claim 1, wherein each of said plurality of acquisition devices includes means for selectively transmitting the memorized signals to said signal central control and recording system upon receipt of control signals either directly from the central control and recording system or upon receipt of control signals via said relay element and transmission cable.

13. A device for bi-directional transmission of signals between a central control and recording system and a plurality of data acquisition devices located within an area which includes at least one obstruction to radio transmission between said central control and recording system and certain ones of said data acquisition devices, said central control and recording system being positioned closer to said obstruction than the most distant one of the certain ones of said data acquisition devices, each of said data acquisition devices including means for collecting data provided in signals originating from one or more seismic sensors and for transmitting the collected data to said central control and recording system when individually interrogated by said central control and recording system, each of said data acquisition devices and said central control and recording system being equipped with transmission means for two-way transmission of data by radio link or by transmission cable; said bi-directional transmission device comprising:

a transmission cable; and a relay device including a radio transmitter-receiver set connected to said transmission cable so that signals received via radio link from said certain ones of said data acquisition devices by said radio transmitter receiver set are transmitted on said transmission cable, said relay device being positioned with respect to said obstruction so as to be capable of receiving signals via radio link from all of said certain ones of said data acquisition devices, and said transmission cable being connected to said central control and recording system, whereby bi-directional exchanges of signals between said central control and recording systems and said certain ones of said acquisition devices are conducted by using both said transmission cable and a radio link via said radio transmitter-receiver set in said relay device.

14. A transmission device according to claim 13, wherein said transmission cable is also connected to at least some of the data acquisition devices which are disposed between said obstruction and said central control and recording system.

* * * * *